ELECTRONIC PULSE GENERATOR

Filed June 30, 1950 6 Sheets-Sheet 1

INVENTOR.
NATHAN A. MOERMAN
BY Alfred W. Barber
ATTORNEY

May 19, 1953 N. A. MOERMAN 2,639,378

ELECTRONIC PULSE GENERATOR

Filed June 30, 1950 6 Sheets-Sheet 2

INVENTOR.
NATHAN A. MOERMAN
BY Alfred W. Barber
ATTORNEY

INVENTOR.
NATHAN A. MOERMAN
BY Alfred W. Barber
ATTORNEY

May 19, 1953 N. A. MOERMAN 2,639,378
ELECTRONIC PULSE GENERATOR
Filed June 30, 1950 6 Sheets-Sheet 4
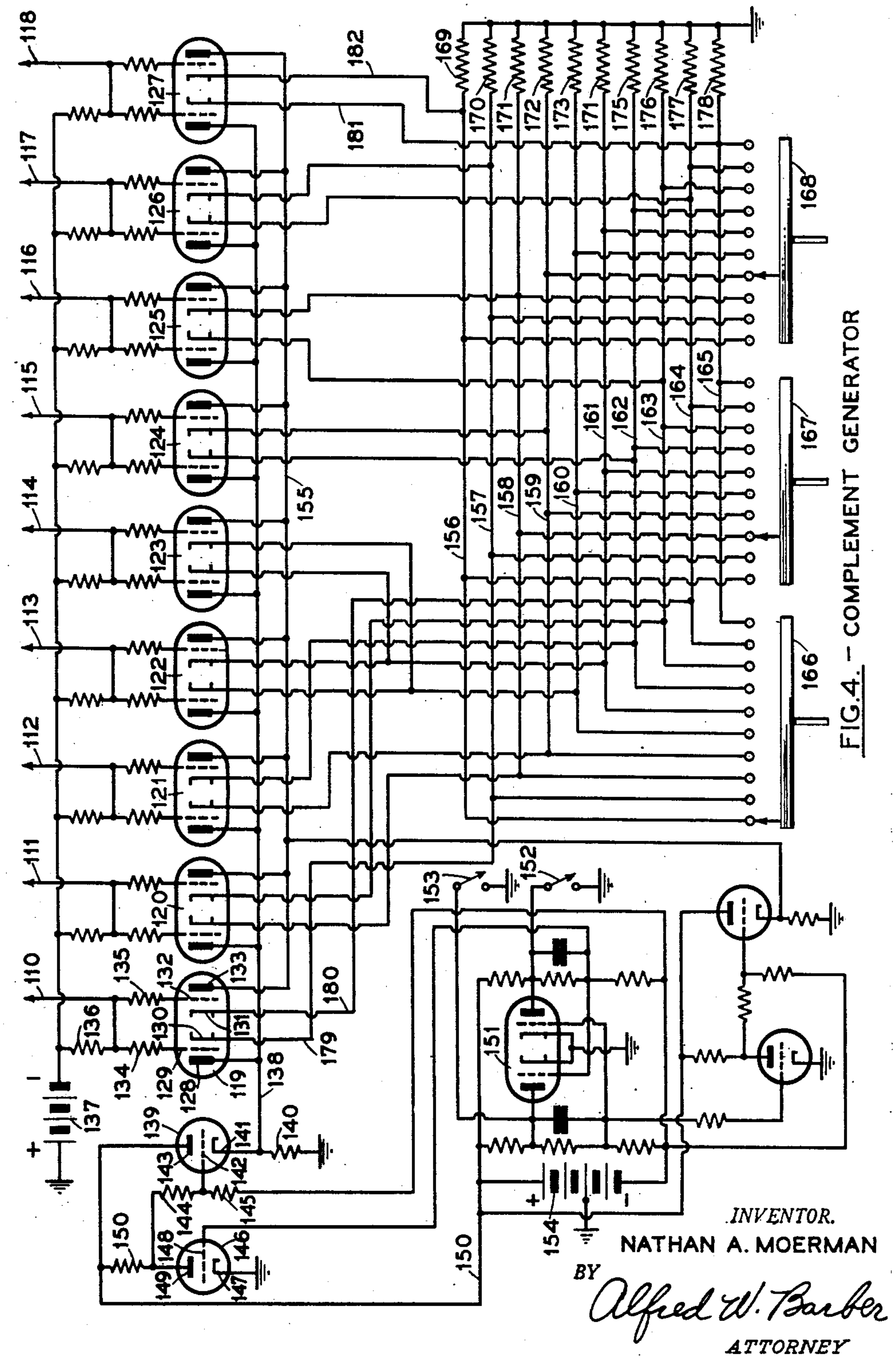
FIG. 4. - COMPLEMENT GENERATOR
INVENTOR.
NATHAN A. MOERMAN
BY Alfred W. Barber
ATTORNEY May 19, 1953 N. A. MOERMAN 2,639,378

ELECTRONIC PULSE GENERATOR

Filed June 30, 1950 6 Sheets-Sheet 5

INVENTOR.
NATHAN A. MOERMAN
BY
Alfred W. Barber
ATTORNEY

May 19, 1953 N. A. MOERMAN 2,639,378

ELECTRONIC PULSE GENERATOR

Filed June 30, 1950 6 Sheets-Sheet 6

INVENTOR.
NATHAN A. MOERMAN

BY Alfred W. Barber

ATTORNEY

Patented May 19, 1953

2,639,378

UNITED STATES PATENT OFFICE 2,639,378

ELECTRONIC PULSE GENERATOR

Nathan A. Moerman, Jackson Heights, N. Y., assignor to Potter Instrument Co. Inc., Great Neck, N. Y., a corporation of New York Application June 30, 1950, Serial No. 171,303

9 Claims. (Cl. 250—27)

The present invention relates to electronic pulse generators and, in particular, pulse generators suitable for use in electronic computers and the like.

Electronic computers are analogous to mechanical computers in carrying out the mathematical processes of addition subtraction, multiplication and division. Whereas the mechanical computer utilizes mechanical wheels, cogs, latches, etc., the electronic computer utilizes electrical pulse generators, electronic counters, pulse combining circuits, etc. One important portion of the electronic computer is a pulse generator which will generate any predetermined number of pulses from 1 through 9 and a carry pulse representing 10. The present invention concerns a simple and effective pulse generator for this purpose.

In the past computer pulse generators have required large numbers of vacuum tubes and complicated circuits. According to the present invention the generation of any given number of pulses utilizes only three vacuum tubes, a double triode phase shifting pulse generator, a matrix driver and an output buffer. Ten of the double triode phase shifting pulse generators are connected in cascade. When an input pulse is applied to the input of the cascaded generators, a series of spaced pulses is generated, one by each stage. The tenth stage generates the tenth pulse which may be used as a carry pulse. Each of the pulse generator stages is coupled to a matrix driver tube the outputs of which are fed into a pulse combining matrix. The matrix provides nine outputs each of which yields a predetermined number of pulses from 1 through 9. The matrix outputs are fed through nine output buffer tubes to output points which may be connected to external utilization means or to a complement generator which provides outputs consisting of pulses from 1 through 9 or complements of 9. Thus the system of the present invention as briefly described above provides at discrete output points any predetermined number of pulses from 1 through 9 and an additional carry or 10th pulse or complements of 9 under the operator's control.

One object of the present invention is to provide a method of and means for electronically generating any predetermined numbers of pulses from 1 through 9 and an additional carry pulse.

Another object is to provide an electronic pulse generator for generating any predetermined number of pulses from one through 9 wherein all pulses are spaced by an equal predetermined time interval from one another.

Still another object is to provide a pulse generator for electronic computers and the like which requires fewer tubes and parts and is cheaper to make than such generators hitherto available.

A still further object is to provide a pulse generator for electronic computers and the like having greatly improved operating characteristics.

Another object is to provide a pulse generator having greatly improved reliability.

Still another object is to provide under selective control, either a predetermined number of pulses or pulses representing the complement of 9.

These and other objects will be apparent from the detailed description of the invention given in connection with the various figures of the drawing.

In the drawing:

Fig. 4 shows a circuit diagram of one form of compliment generator.

Figure 1:
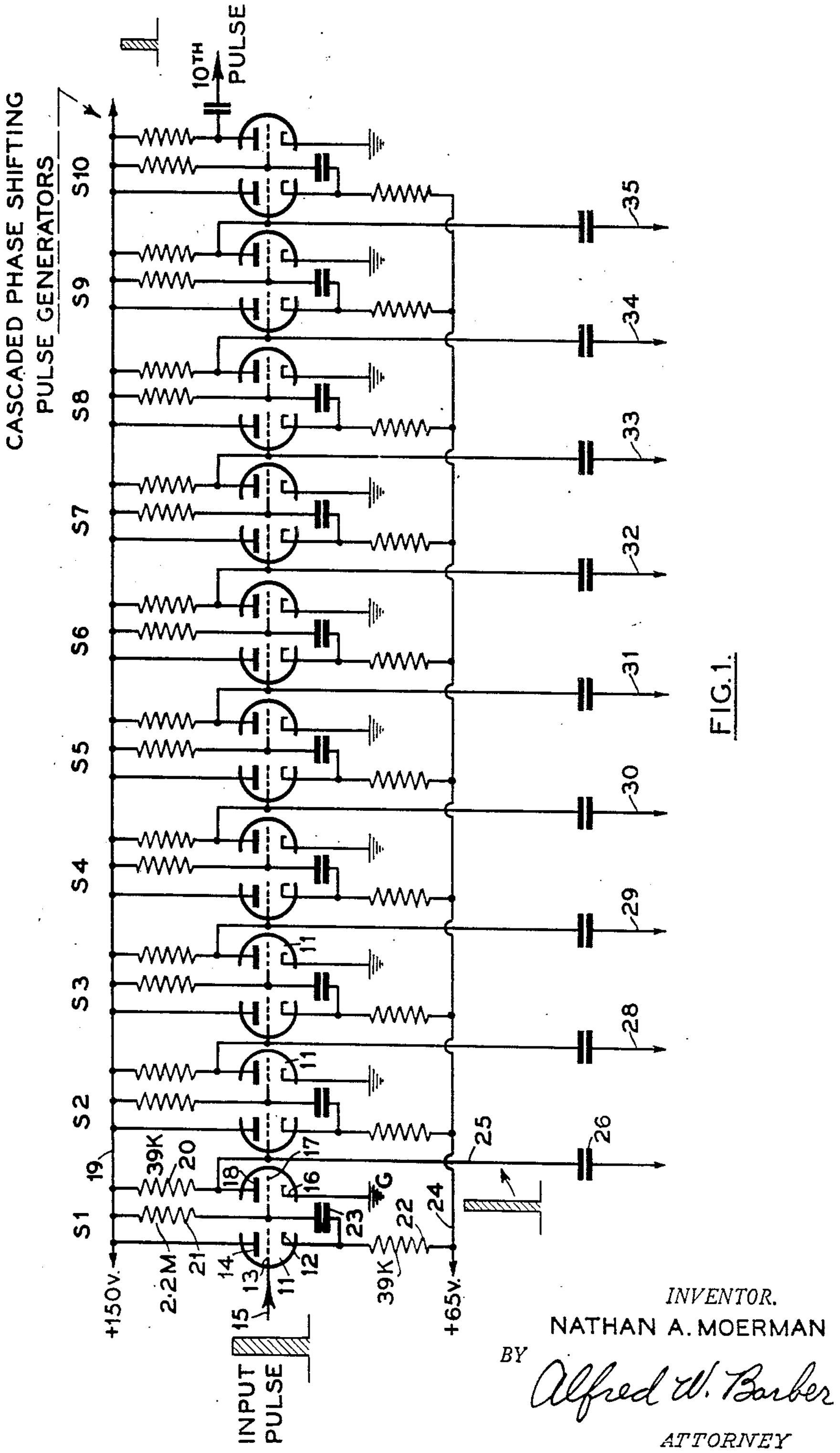
Fig. 1 shows a circuit diagram of one form of ten cascaded phase shifting pulse generators.

Fig. 1 shows a circuit diagram of one form of cascaded phase shifting pulse generators in which a series of ten double triode tubes 11 are connected in cascade. Each double triode includes two cathodes 12 and 16, heated by conventional means not shown, two corresponding grids 13 and 17 and two corresponding plates 14 and 18. Since the operation of each of these double triodes stages is the same it will be explained in connection with Fig. 6 which shows a single stage and in which corresponding numbers have been used to designate corresponding parts. An input pulse (Fig. 6) designated P(IN) is applied over input lead 15 to the first grid 13. This pulse has an amplitude substantially greater than +V1 as indicated by the dotted line and this voltage +V1 is also the cathode bias applied to cathode 12(K1) through cathode resistor 22(R1). While bias V1 is a bias sufficient to cut-off plate current to plate 14(P1), when the voltage on grid 12 exceeds this bias, substantially saturation plate current flows and the voltage at cathode 12 rises sharply. The second triode section including cathode 16(K2), grid 17(G2) and plate 18(P2) is initially operated at saturation with cathode 16 grounded, plate 18 connected to a high voltage source, not shown, through resistor 20 by means of lead 19 and grid 17 also connected to the high voltage source through resistor 21. The rise in the voltage at cathode 12, described above, is differentiated through capacitor 23 and applied to grid 17. However, since grid 17 draws current and represents a low impedance to positive pulses, the rise in voltage from cathode 12 is largely suppressed as shown by the curve marked "P(IN) PERIOD." When the voltage of the pulse at grid 13 returns to zero, the voltage at cathode 12 drops sharply and the differentiated negative pulse through capacitor 23 appears on grid 17. This pulse, since it is in a negative direction, sees a decreasing impedance at grid 17 and quickly cuts off the grid current. The resulting voltage at grid 17 is shown as "P(OUT) PERIOD." This negative pulse on grid 17 quickly cuts off current to plate 18 and results in a sudden rise in voltage at plate 18. As the differentiated negative pulse on grid 17 returns to zero plate current is again established and the voltage at plate 18 returns quickly to its initial value. The net result of the above is a plate voltage pulse at plate 18 as shown at P(OUT) which is of the same form as the input pulse P(IN) but which is shifted in time by an amount equal to the duration of this input pulse. Thus the double triode stage receives a pulse and generates a similar output pulse of the same form but delayed by a predetermined amount, an amount equal to the duration of the input pulse.

Figure 6:
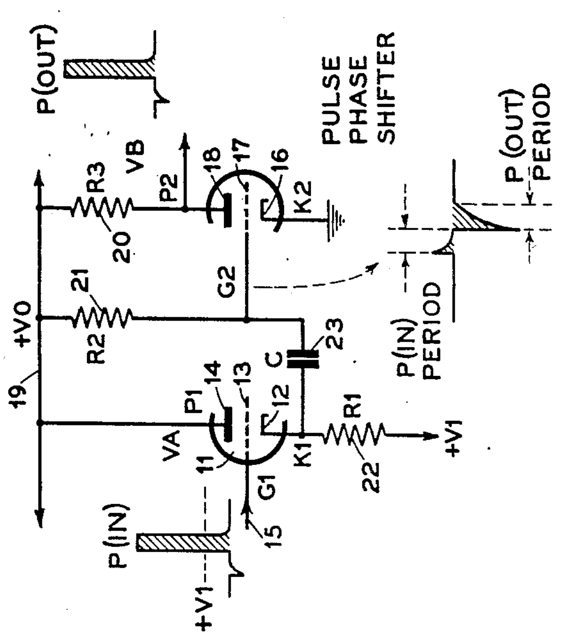
Fig. 6 shows a detailed circuit of one form of a phase shifting pulse generator stage.
Figure 5:
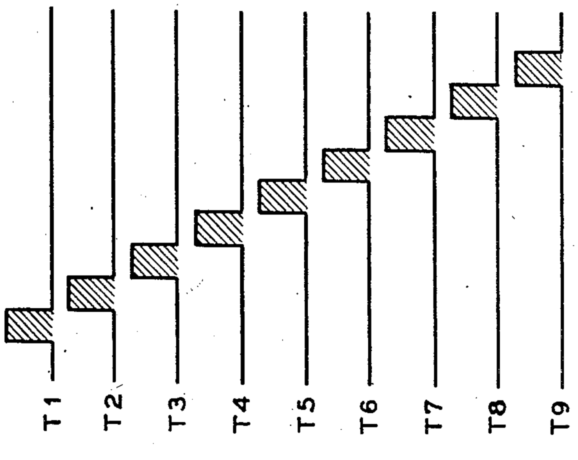
Fig. 5 shows a diagrammatic representation of the time relationship of the pulses in the pulse generators of Fig. 1.

Returning to Fig. 1 it will be seen that there are ten of these double triode stages, designated as S1 through S10, in which each stage is similar to the stage of Fig. 6 described above and each stage, except the 10th feeding the next succeeding stage. Each stage receives a pulse and generates a similar output pulse but displaced in time. Fig. 5 shows nine of these pulses where T1 is the pulse generated by stages S1 of Fig. 1, T2 is the pulse generated by stage S2, etc. The output pulse from stage S1 is fed over lead 25 through differentiating capacitor 26 to lead 27 where it appears differentiated as a sharp positive pulse representing the leading edge and a sharp negaitve pulse representing the trailing edge of the generated pulse. The outputs of the succeeding stages are similarly coupled to leads 28 through 35 at which leads the differentiated form of pulses shown in Fig. 5 appear. The differentiated form of pulse T1 appears at lead 27, of pulse T2 at lead 28, and so on through T9 at lead 35. The tenth stage S10 generates a tenth pulse which may be used as a carry pulse to another pulse generator or may be utilized in any desired manner as, for instance, for resupplying the input pulse.

Figure 2:
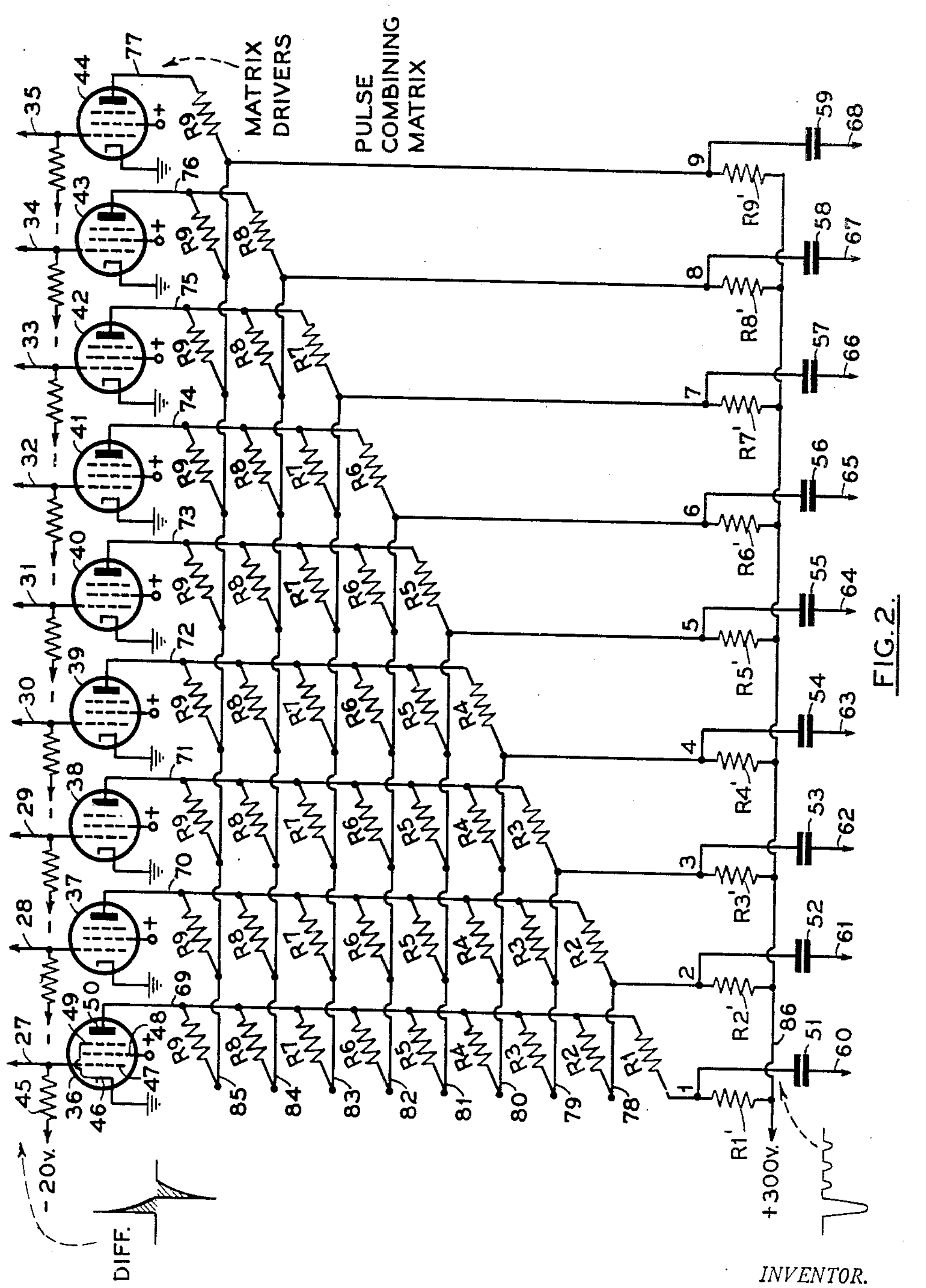
Fig. 2 shows a circuit diagram of one form of the matrix drivers and the pulse combining matrix.

Fig. 2 shows a circuit diagram of one form of pulse combining matrix for receiving the differentiated pulses from the circuits of Fig. 1. The spaced pulses which are generated by the circuit of Fig. 1 are applied to a pulse combining matrix made up of resistors R1 through R9 and the combined pulses appear across resistors R1′ through R9′ which are common to predetermined circuits of the matrix as will be set forth below. Vacuum tubes 36 through 44 may be inserted between the input leads 27 through 35, corresponding to the similarly designated leads of Fig. 1, and the matrix resistors to provide increased sensitivity and decoupling. Each of these tubes may be a suitable vacuum tube as, for instance, a pentode 36 having cathode 46 heated by conventional means, not shown, a control grid 47 which receives a suitable bias through grid resistors 45 from a conventional source, not shown, screen grid 48 maintained at a suitable positive voltage from a conventional source, not shown, suppressor grid 49 and plate 50. Plate 50 is connected over lead 69 to one end of one each of resistors R1 through R9. The other end of resistor R1 is connected through load resistor R1′ to common lead 86 which supplies plate voltage from a conventional source, not shown. The other end of each of resistors R2 through R9 is connected to leads 78 through 85 respectively. The plate of tube 37 is connected over lead 70 to one end of a second series of resistors R2 through R9 the other ends of which are connected to leads 78 through 85 respectively. In the same manner the plates of tubes 38 through 44 are connected over leads 71 through 77 each to a series of resistors one less than the preceeding tube until tube 44 is connected to a single R9 resistor. Leads 78 through 85 are connected to load resistors R2′ through R9′ respectively. Thus it will be seen that R1′ receives the output from only one tube, tube 36, through a single resistor R1 and, hence, a single pulse appears across R1′ each time the pulse generators of Fig. 1 are pulsed. Two pulses, one through each of the two R2 resistors, will appear across R2′ each time the pulse generators are pulsed. One pulse arrives through tube 36 and one through tube 37. In a similar manner three pulses will appear across resistor R3′ through the three R3 resistors and so on up to nine pulses which appear across resistor R9′. Thus there is generate done through nine pulses respectively across resistors R1′ through R9′. These pulses are fed to further means through coupling capacitors 51 through 59 and over leads 60 through 68 respectively. It will be noted that the differentiated pulse as shown in Fig. 2 has positive and negative peaks. The bias applied to the grids of tubes 36 through 44 is sufficiently negative that only the positive peak affects the tube plate current and hence is the only pulse to appear in the matrix from each tube.

Figure 3:
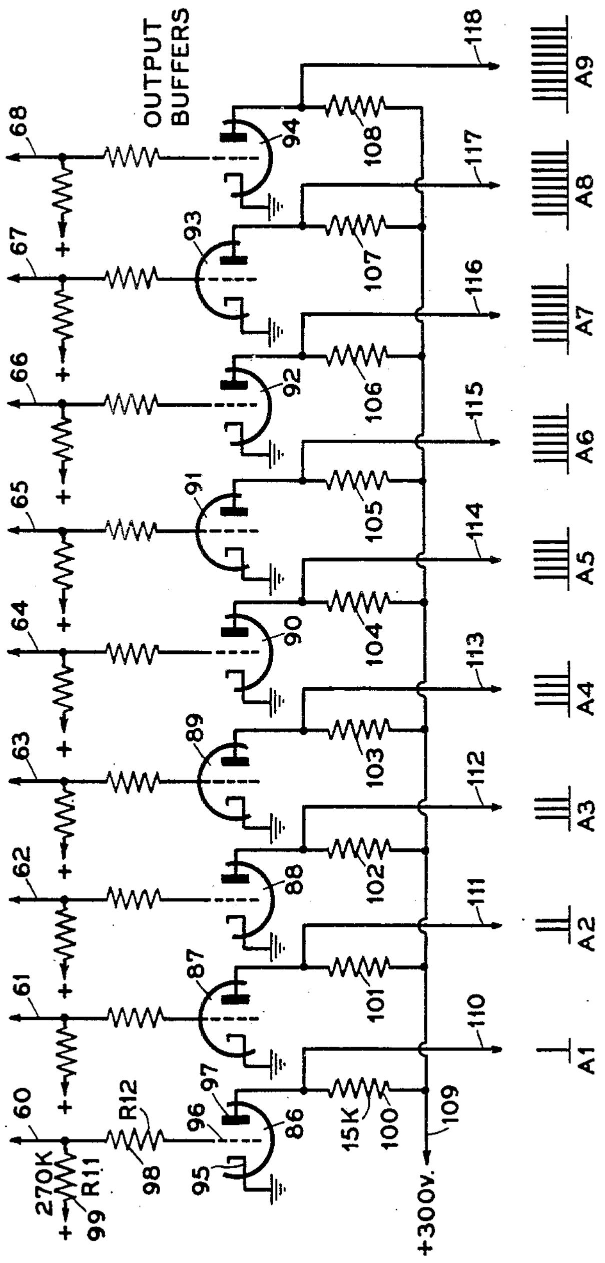
Fig. 3 shows a circuit diagram of one form of output buffers.

Fig. 3 shows one form of output buffer circuit which may be used to prevent interaction of further circuits in the system from causing interaction between groups of pulses and which is also useful in eliminating cross-products. The tubes in this buffer are supplied with a positive grid bias so that only negative pulses of more than a predetermined amplitude affect the plate currents. This removes residual undesired pulses produced by cross couplings in the matrix. The output buffer includes triode sections 86 through 94 which may be portions of dual triodes as shown. These tubes may all be similar to tube 86 which includes cathode 95 heated by conventional means, not shown, control grid 96 and plate 97. The input to tube 86 is received from lead 60, which is a continuation of lead 60 of Fig. 2. This input is applied to grid 96 through current limiting resistor 98. Grid 96 is placed at a positive potential with respect to cathode 95 by means of a conventional source of positive voltage, not shown, applied through resistor 99. Plate 97 is energized from a conventional source of positive voltage, not shown, over lead 109 and through load resistor 100. When a negative pulse over lead 60 exceeds the positive grid bias, the plate current is reduced causing the plate voltage to rise and thereby developing a positive voltage pulse across load resistor 100. The output pulse is applied to further means over lead 110.

In a similar manner triode section 87 receives two pulses over lead 61 and delivers two pulses acorss load 101 to output lead 111; triode section 88 receives three pulses over lead 62 and delivers three pulses across load 102 to output lead 112; triode section 89 receives four pulses over lead 63 and delivers four pulses across load 103 to output lead 113; triode section 90 receives five pulses over lead 64 and delivers five pulses across load 104 to output lead 114; triode section 91 receives six pulses over lead 65 and delivers six pulses across load 105 to output lead 115; triode section 92 receives seven pulses over lead 66 and delivers seven pulses across load 106 to output lead 116; triode section 93 receives eight pulses over lead 67 and delivers eight pulses across load 107 to output lead 117; and triode section 94 receives nine pulses over lead 68 and delivers nine pulses across load 108 to output lead 118. The above thus describes circuits for generating from one to nine pulses as shown at A1 to A9 inclusive. The combination shown in Figs. 1, 2 and 3 and described above may be utilized in many ways that will be apparent to those skilled in the art as a source of any number of spaced pulses from one through nine.

In electronic computers it is necessary to be able to select pulses representing any given number or pulses representing the complement of the number. The complement generator shown in Fig. 4 if fed with one through nine pulses may be operated to yield zero, one, two, etc. through nine pulses, or nine, eight, etc. through zero, or the complements of the ascending series of numbers. Essentially the circuit consists in a series of nine double triodes, each of which receives an input of a given number of pulses and providing either of two outputs, one being the given number and the other furnishing the complement for another number. Selection by a switch control gives either the direct number output or the complement output. Output circuits are provided at which either the direct numbers or their complements are available.

Fig. 4 shows nine double tubes which may conveniently be double triodes 119, 120, 121, 122, 123, 124, 125, 126 and 127 as shown. Input pulses over leads 110 through 118 are applied to the grids of these tubes each tube receiving a given number of pulses on both its grids. Since the circuits are symmetrical, the circuits of tube 119 will be described in detail. Tube 119 includes cathodes 130 and 131 heated by conventional means, not shown, grids 129 and 132 and plates 128 and 133. Grids 129 and 132 are coupled to the single pulse lead 110 by means of resistors 134 and 135 while a negative bias is supplied from a suitable source such as battery 137 through resistor 136. Cathode 130 is connected over leads 179 and 157 to the high end of resistor 170 the other end of which is grounded. When plate 128 is energized, the single pulse received over lead 110 is relayed to resistor 170. Plate 128 is energized in any suitable manner under control of the operator and switch 152. One way in which switch 152 may be utilized to energize plate 128 is shown in which switch 152, when closed, pulls down a plate of trigger connected double triode 151 placing a negative bias on grid 148 of tube 146. Tube 146 may conveniently be a triode having plate 149, control grid 148 and cathode 147 heated by conventional means, not shown. When grid 148 goes negative, due to closing switch 152 and the presence of a bias from voltage source 154, the current to plate 149 through resistor 150 from source 154 over lead 150 drops and plate 149 becomes more positive placing a positive bias on grid 142 of riode 139 through resistor 144. The triode 139 includes plate 143, grid 142 and cathode 141 heated by conventional means, not shown. Plate 143 is energized from voltage source 154 over lead 150. Cathode 141 returns to ground through resistor 140. When grid 142 is made positive by closing switch 152, as described above, cathode 141 goes positive due to the cathode current drop placing a positive voltage on lead 138 and, hence on plate 128 and the corresponding plate of tubes 120 through 127. When plate 128 is energized in the above manner, cathode 130 repeats the pulses applied to grid 129 and provides an output over leads 179 and 157 across resistor 170. The pulses so placed on resistor 170 may be taken off by sliding any one of switches 166, 167 or 168 to the corresponding contact point. In this way since one pulse is received over lead 110, two pulses over lead 111 and so on, resistors 169 through 178 receive 0, 1 etc. through 9 pulses, resistor 175 receiving six pulses, for example. These pulses may be selected in any desired manner by slide switches 166, 167 and 168. The desired sequence of pulses are placed on resistors 169 through 178 over leads 156 through 165 from tubes 119 through 127 when one set of elements is energized over lead 138 by closing switch 152. The sequence just described my be designated the "direct" sequence.

The complement sequence, that is, a sequence representing the complement of nine for each point on switches 166, 167 and 168 may be provided by closing switch 153. Closing switch 153 throws trigger tube 151 to the other side conducting and lead 155 is energized in a manner corresponding to the way in which lead 138 is energized as described above. When lead 155 is energized, plate 128 and the corresponding plates in the other tubes are deenergized and plate 133 is energized together with the plates corresponding to it in tubes 120 through 127. When plate 133 is energized, cathode 131 is activated and the pulse from lead 110 on grid 132 is relayed over leads 180 and 164 to resistor 177. It will be noted that this places a single pulse on resistor 177 and the corresponding points on switches 166, 167 and 168 whereas in the direct sequence this resistor and these switch points carried eight pulses. Thus, the single pulse represents the complement of nine. In the same manner tubes 120 through 127 relay pulses representing complements of nine to resistors 169 through 178 and to the corresponding switch points. Thus, closing switch 152 provides a direct series of pulses zero through nine on the points of switches 166, 167 and 168 while closing switch 153 provides a series representing the complements on these switch points.

Figure 7:
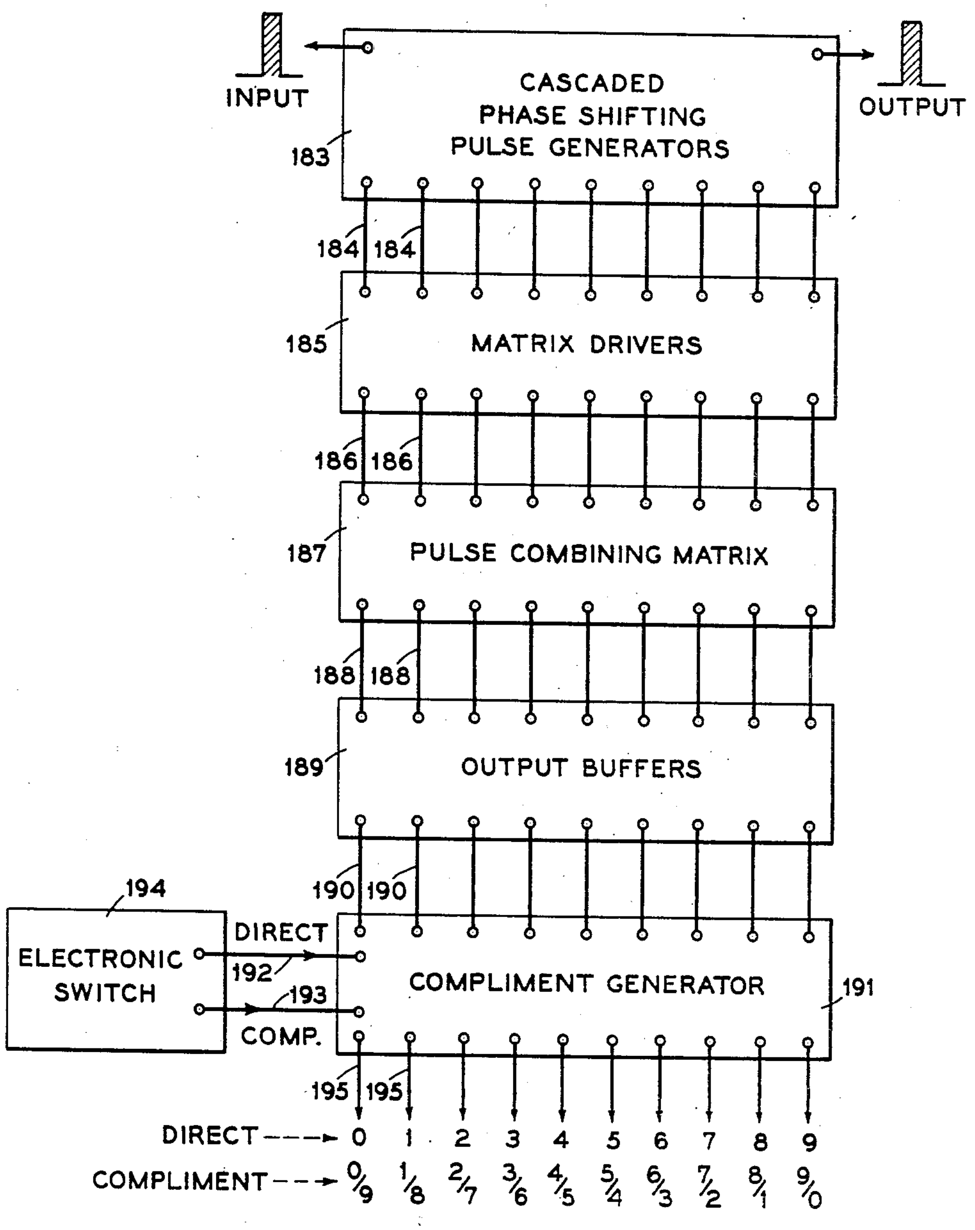
Fig. 7 shows a block diagram of the various circuits of Figs. 1 through 4 combined to show their relationship one with the other.

Fig. 7 shows a block diagram of a complete system made up of the components described above. The cascaded phase shifting pulse generators 183, shown in detail in Fig. 1, feed single spaced pulses over leads 184 to the matrix drivers 185, shown in detail in Fig. 2, which relay these pulses over leads 186 to the pulse combining matrix 187, also shown in detail in Fig. 2, which then provides a series of pulses from one to nine over leads 188 to the output buffers 189, shown in detail in Fig. 3, which also relays a series of pulses from one through nine over leads 190 to the complement generator 191 which under control of electronic switch 194 over direct lead 192 or complement lead 193, as shown in detail in Fig. 4, provides either a direct series of pulses from zero through nine or a complement series from nine through zero over leads 195 to any suitable external utilization means. The manner in which this system is utilized in electronic computers or the like will be apparent to those skilled in the art.

While only one embodiment of the present invention has been shown and described, many modifications of the present invention will be apparent within the spirit and scope of the invention as set forth in the appended claims will be apparent to those skilled in the art.

What is claimed is:

1. In a pulse generating system, the combination of, a plurality of single pulse generators, time delay means for coupling said pulse generators in cascade to provide a plurality of substantially equally spaced pulses, a resistive network matrix, and means for feeding the last said pulses into said matrix for combining said pulses to form predetermined groups of pulses.

2. In a pulse generating system, the combination of, a plurality of pulse responsive single pulse generators, a plurality of time delay coupling circuits for connecting said pulse generators in cascade to provide a series of substantially equally spaced pulses, a resistive network matrix, and means for feeding the last said pulses into said matrix for receiving said pulses and combining them to form predetermined groups of pulses.

3. In a pulse generating system, the combination of, a plurality of similar electronic pulse generating stages including time delay means incorporated in each of said stages, coupling circuits for connecting said stages in cascade to provide a series of spaced pulses, resistive network matrix for receiving said pulses, and a plurality of output circuits coupled to said matrix for deriving from said matrix discrete groups of pulses each of said groups comprising a predetermined number of pulses.

4. In a pulse generating system, the combination of, a plurality of similar electronic pulse generating stages including time delay circuits incorporated in each of said stages, coupling circuits for connecting said stages in cascade to provide a series of spaced pulses, an electrical matrix for receiving said pulses, a plurality of output circuits coupled to said matrix for deriving from said matrix discrete groups of pulses each of said groups comprising a predetermined number of pulses, and means for shifting said groups from one order of succession to a second order of succession.

5. In a pulse generator system, the combination of, a pulse generator for generating a series of individual pulses, an electrical matrix for combining said pulses into groups of pulses wherein each group comprises a predetermined number of pulses, a series of discrete output circuits, and switching means for applying said pulses in said groups to said circuits in one of two predetermined sequences.

6. In a pulse generating system, the combination of, a pulse generator for generating a series of individual pulses, an electrical network for combining said pulses into groups of pulses, output circuits for receiving said groups in predetermined sequence, and switch means for reversing said sequence.

7. In a pulse generating system, the combination of, a pulse generator including a plurality of time delay circuits for generating a series of spaced pulses, an electrical network for combining said pulses into groups of pulses comprising numbers of pulses forming a predetermined sequence, a series of output circuits circuits for applying said pulses in said sequence to said output circuits in a predetermined order, and switch means for altering said order.

8. In a pulse generating system, the combination of, a phase shifting pulse generator for generating at least nine individual and spaced pulses, at least nine pulse receiving points, a pulse combining and distributing resistive network for receiving said pulses and for applying the first pulse to one of said receiving points, the first and second of said pulses to a second of said receiving points and in like manner applying one more pulse to each succeeding receiving point up to and including nine pulses to the ninth receiving point.

9. In a pulse generating system, the combination of, means for generating groups of pulses comprising one pulse through nine pulses, nine output terminals designated one through nine, nine electronic switches, circuits for applying one of said groups of pulses to each of said switches, and connections between each of said switches and two output terminals, one of the last said terminals being the terminal designated corresponding to the number of pulses in the group applied to the electronic switch connected thereto and the other terminal being the terminal designated with the complement of nine of the number of pulses in the applied group for distributing pulses to said terminals in one sequence when said electronic switches are activated in one direction and for distributing pulses in a complement of nine sequences when said electronic switches are activated in one direction and for distributing pulses in a complement of nine sequence when said electronic switches are activated in a second direction.

NATHAN A. MOERMAN.

References Cited in the file of this patent

UNITED STATES PATENTS

| Number | Name | Date |
|---|---|---|
| 2,398,771 | Compton | Apr. 23, 1946 |
| 2,473,444 | Rajchman | June 14, 1949 |
| 2,515,195 | Clark | July 18, 1951 |
| 2,572,891 | Smith | Oct. 30, 1951 |